(12) United States Patent
Baro et al.

(10) Patent No.: US 9,103,362 B2
(45) Date of Patent: Aug. 11, 2015

(54) FITTING FOR FURNITURE

(75) Inventors: Dietmar Baro, Berlin (DE); Reiner Kreyenkamp, Bad Essen (DE); Frank Martling, Bad Essen (DE)

(73) Assignee: Kesseböhmer Holding e.K., Bad Essen (DE)

( * ) Notice: Subject to any disclaimer, the term of this patent is extended or adjusted under 35 U.S.C. 154(b) by 0 days.

(21) Appl. No.: 13/880,058

(22) PCT Filed: Oct. 4, 2011

(86) PCT No.: PCT/EP2011/004924
§ 371 (c)(1),
(2), (4) Date: May 19, 2013

(87) PCT Pub. No.: WO2012/052113
PCT Pub. Date: Apr. 26, 2012

(65) Prior Publication Data
US 2014/0147200 A1 May 29, 2014

(30) Foreign Application Priority Data
Oct. 18, 2010 (DE) ............... 20 2010 014 344 U

(51) Int. Cl.
*F16B 7/22* (2006.01)
*A47B 49/00* (2006.01)
*F16B 7/10* (2006.01)

(52) U.S. Cl.
CPC ............... *F16B 7/22* (2013.01); *A47B 49/006* (2013.01); *F16B 7/105* (2013.01); *Y10T 403/7096* (2015.01)

(58) Field of Classification Search
CPC .... A47B 95/02; A47B 81/00; F16B 70/0426; F16B 7/105; F16K 51/00; A47C 3/20; B25G 1/04; B25G 3/26; A47L 13/42; A47L 9/242
USPC ........... 248/235, 239, 241, 243, 218.4, 219.3, 248/125.8; 403/109.6, 379.1, 379.2, 109.5, 403/109.1, 109.2, 109.4, 109.8, 379.3
See application file for complete search history.

(56) References Cited

U.S. PATENT DOCUMENTS

| | | | | |
|---|---|---|---|---|
| 3,498,650 A | * | 3/1970 | Strange | 403/373 |
| 3,757,705 A | * | 9/1973 | Maslow | 108/147.13 |
| 3,980,805 A | * | 9/1976 | Lipari | 174/88 C |
| 4,595,107 A | * | 6/1986 | Welsch | 211/187 |
| 4,647,241 A | * | 3/1987 | Weber | 403/18 |
| 4,662,771 A | * | 5/1987 | Roe et al. | 403/108 |
| 5,039,043 A | * | 8/1991 | Hodge | 248/125.8 |

(Continued)

FOREIGN PATENT DOCUMENTS

| | | |
|---|---|---|
| DE | 76 17 755 U1 | 2/1977 |
| DE | 43 03 832 A1 | 8/1994 |

(Continued)

*Primary Examiner* — Nkeisha Smith
(74) *Attorney, Agent, or Firm* — Gudrun E. Huckett

(57) ABSTRACT

The invention relates to a fitting for furniture, in particular for kitchen corner cabinets (1) with an interior (2) which is accessible via a corner cabinet door (3), having a substantially vertical load-bearing column (5), which can be supported at a fixed location, for example, in the interior (2) of the furniture, and having a connector (8), which can be arranged on the load-bearing column (5) and is intended for retaining articles, such as a shelf (6) or the like, which are to be supported on the load-bearing column (5), wherein the connector (8) can be supported on the load-bearing column (5) such that it can be altered in height via a height adjuster (9).

8 Claims, 3 Drawing Sheets

(56) References Cited

U.S. PATENT DOCUMENTS

| | | | |
|---|---|---|---|
| 5,620,059 A * | 4/1997 | Crispeno | 182/127 |
| 5,779,070 A * | 7/1998 | Dickinson et al. | 211/187 |
| 5,957,819 A * | 9/1999 | Cortesi | 482/121 |
| 6,254,305 B1 * | 7/2001 | Taylor | 403/378 |
| 6,461,074 B2 * | 10/2002 | Taylor | 403/378 |
| 6,698,962 B2 * | 3/2004 | Wang | 403/109.4 |
| 7,040,832 B2 * | 5/2006 | Hsieh | 403/109.3 |
| 7,168,673 B1 * | 1/2007 | Piemonte et al. | 248/544 |
| 7,300,077 B2 * | 11/2007 | Tawara et al. | 285/417 |
| 7,318,631 B2 * | 1/2008 | Kreyenkamp | 312/238 |
| 7,506,775 B2 * | 3/2009 | Hartzell et al. | 220/1.5 |
| 7,607,369 B2 * | 10/2009 | Cox et al. | 74/502.6 |
| 7,748,645 B2 * | 7/2010 | Breese | 239/172 |
| 8,286,564 B2 * | 10/2012 | Karl et al. | 108/107 |
| 8,622,355 B2 * | 1/2014 | Pryor et al. | 248/188.5 |
| 2002/0046982 A1 * | 4/2002 | Guizzardi | 211/187 |
| 2005/0199160 A1 * | 9/2005 | Ching-Po | 108/107 |

FOREIGN PATENT DOCUMENTS

| | | |
|---|---|---|
| DE | 20 2005 020 922 U1 | 12/2006 |
| DE | 10 2006 028 249 A1 | 12/2007 |
| EP | 1 098 130 A1 | 5/2001 |

* cited by examiner

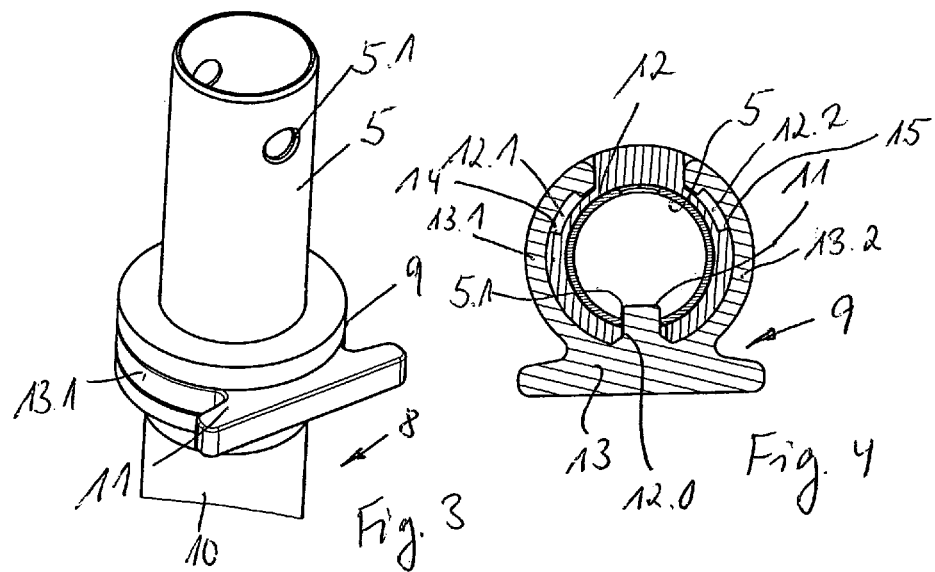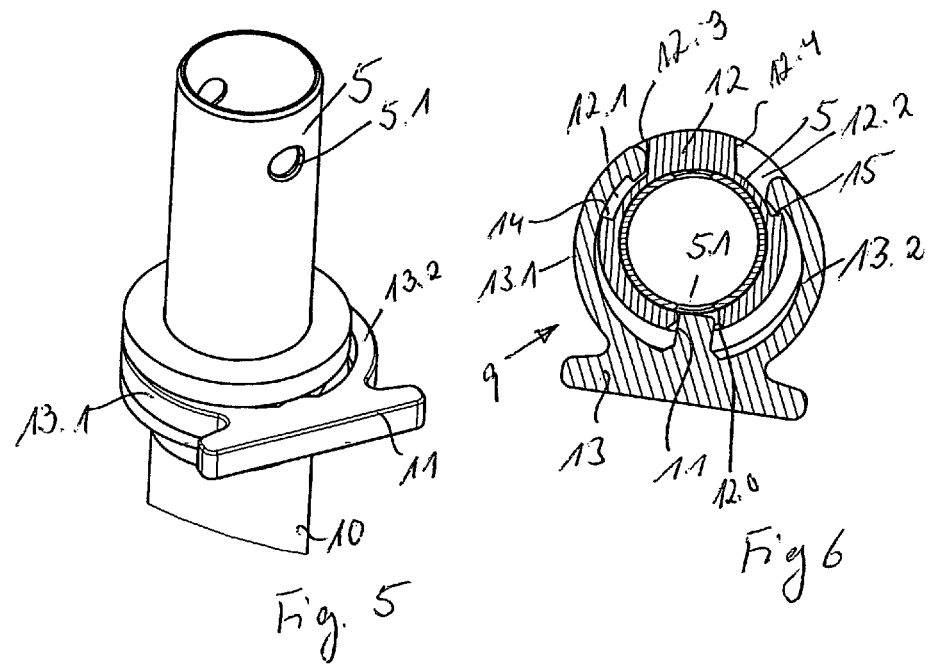

US 9,103,362 B2

1
FITTING FOR FURNITURE

BACKGROUND OF THE INVENTION

The invention concerns a fitting for furniture, in particular a fitting for kitchen corner cabinets with an interior that is accessible by a corner cabinet door, comprising a substantially vertical support column that is, for example, stationarily supportable in the interior of the piece of furniture as well as a connector to be arranged on the support column for securing objects that are to be supported on the support column, for example, a shelf and the like.

Fittings for furniture of the aforementioned kind, in particular for kitchen corner cabinets of the aforementioned kind comprising an interior that is accessible by means of a corner cabinet door, for securing shelves that can be pivoted out of the corner cabinet are disclosed in EP 1 949 817 B1. In this fitting, the vertical support column can be adjusted to various cabinet heights in such a way that the support column is of a two-part configuration and can telescope. Objects that are to be supported on the support column such as shelves can be supported however only on one part of the two-part support column so that shelves cannot be arranged in the upper area of the support column. This is contrary to an optimal utilization of the cabinet interior of a piece of furniture.

It is the object of the present invention to provide a fitting for furniture with which objects to be supported on the support column, for example, shelves and the like, can be supported across a great vertical range on the support column.

SUMMARY OF THE INVENTION

For solving this object, the fitting for furniture of the aforementioned kind is characterized in that the connector is height-adjustably supportable by means of a height adjuster on the support column so as to be height-adjustable.

Accordingly, a fitting for furniture is provided with which by means of a separate height adjuster, that is to be provided adjacent to the connector on the support column, the height-adjustable support action of the connector and thus also of the object to be secured on this connector, such as shelves, can be carried out. The height adjuster ensures the vertical position of the connector to be assumed so that the connector can be designed to be free of any requirements with respect to height adjustment. This height adjuster can also be supported on the support column in the upper areas thereof so that in this way an interior of a piece of furniture, for example, also a kitchen corner cabinet, can be utilized in an optimal way. The height adjuster can be a component that supports the connector and thus also the support arms to be secured thereat, for example, a shelf, in downward direction so that the connector must only engage around the support column. The height adjuster as such can be designed such that, with a few manipulations, it can be released from the support column, for example, also without tools, from the support column, in order to perform a vertical adjustment. Fastening means between connector and support column must not be released for a vertical adjustment. Instead, such fastening means are not required in general. The height adjuster itself can be optimally adapted to the special constructive requirements on the support and the height adjustment so that with minimal constructive expenditure an optimal fitting with on the height adjustment possibility even of shelves is provided.

BRIEF DESCRIPTION OF THE DRAWINGS

Further advantageous embodiments result from the dependent claims, the following description, and the drawing. The drawing shows in:

FIG. 3 an embodiment of a height adjuster on a vertical support column in a perspective illustration;

FIG. 4 a cross-sectional illustration of the embodiment according to FIG. 3;

FIG. 5 an illustration of the height adjuster in analogy to FIG. 3 in an unlocked position in which a height adjustment can be realized;

FIG. 6 a cross-sectional illustration of the embodiment according to FIG. 5;

DESCRIPTION OF PREFERRED EMBODIMENTS

Figure 1:
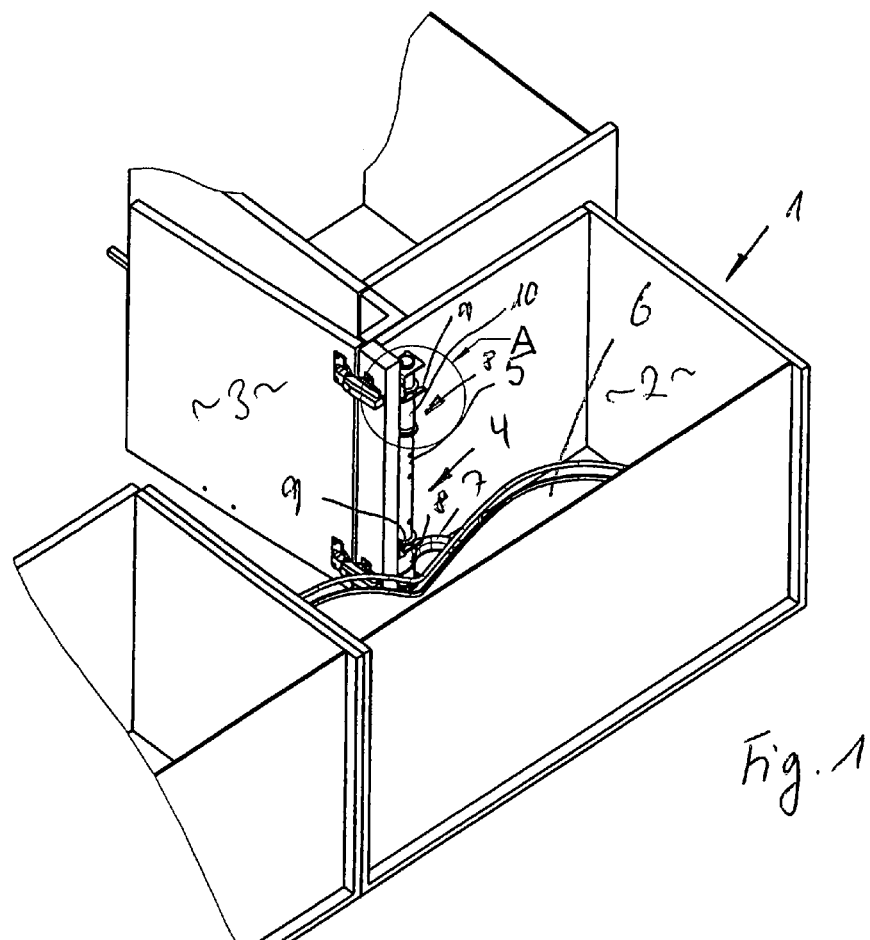
FIG. 1 an embodiment of a fitting in the mounted state, showing as an example a partially broken-away, perspectively illustrated kitchen corner cabinet.

In the drawing, parts that are basically the same are identified with coinciding reference numerals. In general, 1 indicates a piece of furniture in the drawing, i.e., a kitchen corner cabinet with an interior 2 that is accessible by means of a door 3. In the interior 2, the fitting referenced in general by 4 is provided which comprises a vertically oriented support column 5 that is connected by means of screw connections, not illustrated in detail, to a sidewall of the kitchen corner cabinet 1.

Figure 2:
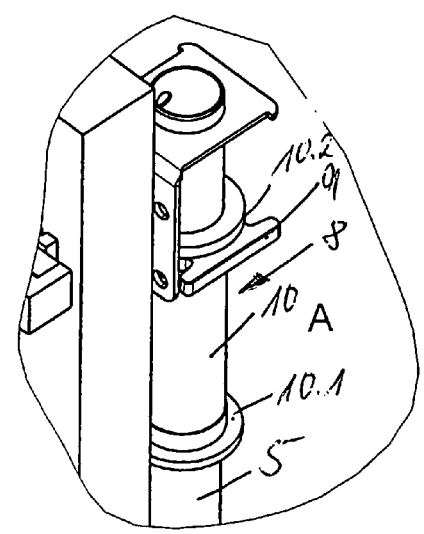
FIG. 2 a detail of the view "A" in FIG. 1.

A shelf 6 is connected by means of a support arm 7 and a connector 8 on the support column. The connector 8 has correlated therewith a height adjuster 9 that is a part of a fastening element 10 that engages around the vertical support column (see also FIG. 2). In the illustrated embodiment, on the fastening element 10 a bottom collar 10.1 and a top collar 10.2 are formed and, in the illustrated embodiment, the latter is part of the height adjuster 9. In the FIGS. 3 to 6, the embodiment of the height adjuster is illustrated in more detail. The height adjuster 9 is provided with a locking projection 11 and to be inserted into appropriate cutout holes 5.1. The height adjuster 9 is comprised in the illustrated embodiment of two parts, i.e., an inner part 12 surrounding the vertical support column 5 and an actuator 13. The actuator surrounds sectionwise the inner part 12 for which purpose the inner part 12, in turn, has a cutout hole 12.1 which, in the mounted state of the height adjuster (FIG. 3 and FIG. 4) is penetrated by the locking projection 11 as is the cutout hole 5.1 of the vertical support column so that the height adjuster can be secured on the vertical support column and thereby can support the connector. When a fastening element 10 is provided, the height adjuster 9 can also extend above the connector 8 because, by means of the height adjuster 9 and the locking projection 11, the fastening element 10 is secured and can support the connector 8 and therefore also the support arm 7 and the shelf 6 by means of the bottom collar 10.1 (FIG. 2).

The inner part 12 is provided with a (left) guide path 12.1 and a (right) guide path 12.2 in which a leg 13.1 or 13.2 is guide, respectively. The guide paths 12.1 and 12.2 each have a guide path length up to a lower (in FIGS. 4 and 6) terminal stops 14 and 15 and upper terminal stops 12.3 and 12.4 that are oriented appropriately for release and locking of the height adjuster 9 on the vertical support column 5.

In FIG. 4, the position is shown in which the legs 13.1 and 13.2 have assumed their final mounted position and are positioned at the upper end of the guide path. The locking projection 11 is positioned in the cutout holes 12.1 and 5.1 so that the height adjuster is locked at the vertical support column 5.

In FIG. 6, by the handle of the actuator the right leg 13.2 is moved down to the lower stop 15 wherein the guide path length of the guide path 12.2 is matched such to the release movement or the release travel that the locking projection 11 is moved out of the cutout hole 5.1 of the vertical support column 5. During the movement of the leg 13.2 in the guide path 12.2, the other leg 12.1 is supported on the upper terminal stop 12.3 so that the locking projection 11 can be moved safely out of the cutout hole 5.1.

As an alternative, it is possible to pull the actuator as a whole so that both legs 13.1 and 13.2 reach the terminal stops 14, 15. In this way, the decoupling action can be done also. The height adjuster 9 is then decoupled from the vertical support column 5 so that a height adjustment can be performed. When the left leg 13.1 in FIG. 6 is also moved in the guide path 12.1 to the stop 14, the actuator 13 can be decoupled from the inner part 12. FIG. 5 shows the state illustrated in FIG. 6 in section in a perspective illustration.

Figure 7:
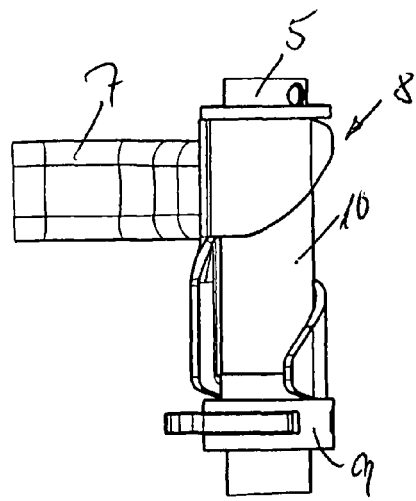
FIG. 7 an illustration of the support column with connector, supported on the height adjuster, in the finish-mounted state.
Figure 8:
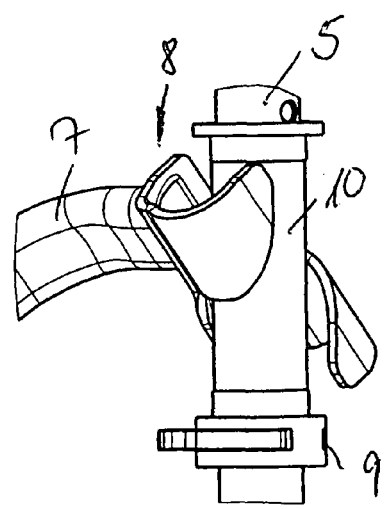
FIGS. 8 and 9 the embodiment according to FIG. 7 during mounting of the connector for support on the height adjuster.
Figure 9:
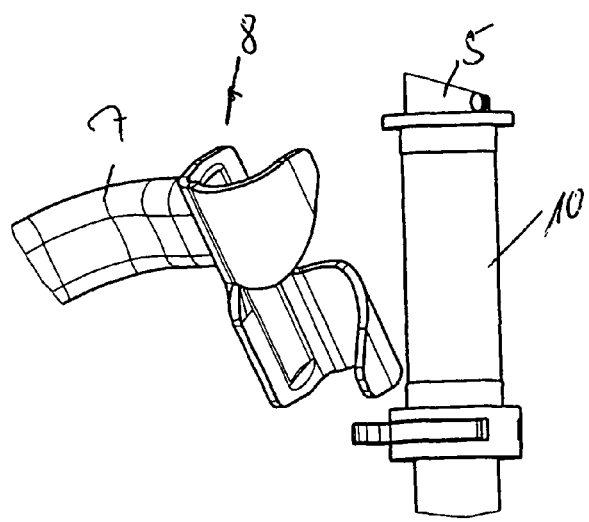

In FIGS. 7 to 9 an embodiment of a connector 8 is illustrated which can be attached without any tool on the fastener 10 of the vertical support column 5 with the height adjuster 9.

FIG. 9 shows a starting position from which the fastener 8 with oppositely oriented arms and intermediately positioned gap is to be mounted. In FIG. 8 the fastener 10 with the support column 5 is threaded into the gap between the oppositely oriented arms of connector 8. When this state is reached, the connector 8 only has to be pivoted back into the position illustrated in FIG. 7 where it is supported on the height adjuster 8 and therefore is safely securable on the support column 5 in a height-adjustable way.

What is claimed is:

1. A fitting for a piece of furniture, the fitting comprising:
    a substantially vertical support column supported stationarily in an interior of a piece of furniture;
    a connector arranged on the support column and adapted to secure objects on the support column;
    a height adjuster connected to the support column;
    wherein the connector is supported on the height adjuster so as to be height-adjustably supported on the support column;
    wherein the height adjuster engages around the support column;
    wherein the height adjuster comprises at least a first part and a second part, wherein the first part is an actuator that is secured in a cutout hole provided in the support column;
    wherein the second part is an inner part surrounding at least sectionwise the support column, wherein the actuator surrounds at least sectionwise the inner part;
    wherein the inner part has a cutout hole that is congruent with the cutout hole in the support column, wherein the actuator is provided with a locking projection that penetrates the cutout hole of the inner part;
    wherein the actuator has a first leg and a second leg, wherein the first leg has a first guide end and the second leg has a second guide end, wherein the first and second legs of the actuator surround sectionwise the inner part, wherein the first guide end is guided in a first guide path provided on the inner part and the second guide end is guided in a second guide path provided on the inner part, wherein the first and second guide paths each have a first terminal stop and a second terminal stop.

2. The fitting according to claim 1, wherein the fitting has a final mounted position in which the first leg is resting on the first terminal stop of the first guide path and the locking projection of the actuator penetrates the cutout hole of the support column and the cutout hole of the inner part, wherein the first and second guide paths each have a guide path length such that, by a movement of the first leg in the first guide path from the first terminal stop to the second terminal stop of the first guide path, the locking projection is moved out of the cutout hole of the support column and, subsequently, the height adjuster is moved for height adjustment on the support column.

3. The fitting according to claim 2, wherein during the movement of the first leg in the first guide path the second leg is supported on the first terminal stop of the second guide path.

4. The fitting according to claim 3, wherein the locking projection of the actuator is movable out of the cutout hole in the support column by a movement of the first leg in the first guide path as well as by a movement of the second leg in the second guide path.

5. The fitting according to claim 4, wherein the locking projection of the actuator is movable out of the cutout hole of the support column and out of the cutout hole of the inner part of the height adjuster by a movement of the first and second legs of the actuator in the first and second guide paths from the final mounted position at the first terminal stops to the second terminal stops.

6. The fitting according to claim 2, wherein the locking projection of the actuator is movable out of the cutout hole of the support column and out of the cutout hole of the inner part of the height adjuster by a movement of the first and second legs of the actuator in the first and second guide paths from the final mounted position at the first terminal stops to the second terminal stops.

7. The fitting according to claim 1, wherein the support column has several cutout holes arranged at a spacing above each other and wherein the actuator has a locking projection that engages one of the several cutout holes.

8. The fitting according to claim 1, wherein the height adjuster has a collar on which the connector, surrounding at least sectionwise the support column, is detachably supported.

* * * * *